(12) United States Patent
Okuda

(10) Patent No.: US 8,009,226 B2
(45) Date of Patent: Aug. 30, 2011

(54) DIGITAL CAMERA WITH IMPROVED PORTABILITY AND EASE OF USE

(75) Inventor: Tatsuo Okuda, Kita-ku (JP)

(73) Assignee: Ricoh Company, Ltd., Tokyo (JP)

( * ) Notice: Subject to any disclaimer, the term of this patent is extended or adjusted under 35 U.S.C. 154(b) by 1218 days.

(21) Appl. No.: 10/780,761

(22) Filed: Feb. 19, 2004

(65) Prior Publication Data

US 2004/0165108 A1    Aug. 26, 2004

Related U.S. Application Data

(63) Continuation of application No. 09/536,022, filed on Mar. 27, 2000, now Pat. No. 7,057,660.

(30) Foreign Application Priority Data

Mar. 26, 1999  (JP) .................................. 11-082803

(51) Int. Cl.
*H04N 5/222*    (2006.01)
(52) U.S. Cl. ........ 348/370; 348/371; 348/372; 348/373; 348/374; 348/375
(58) Field of Classification Search .......... 348/370–376; D16/200, 202, 211, 209, 239, 304
See application file for complete search history.

(56) References Cited

U.S. PATENT DOCUMENTS

| | | | | |
|---|---|---|---|---|
| 4,302,084 A | * | 11/1981 | Greenwald et al. | 396/106 |
| 4,367,028 A | * | 1/1983 | Tomatsuri et al. | 396/448 |
| 4,557,574 A | * | 12/1985 | Kohno et al. | 396/448 |
| 5,005,032 A | * | 4/1991 | Burnham | 396/178 |
| 5,315,342 A | * | 5/1994 | Cocca | 396/104 |
| 5,508,769 A | | 4/1996 | Inoue et al. | |
| 5,805,947 A | | 9/1998 | Miyamoto et al. | |
| 5,845,166 A | * | 12/1998 | Fellegara et al. | 396/429 |
| 5,870,636 A | * | 2/1999 | Sugita et al. | 396/106 |
| 5,892,996 A | | 4/1999 | Yokota | |
| 6,278,846 B1 | * | 8/2001 | Kobayashi et al. | 396/178 |
| 6,327,423 B1 | | 12/2001 | Ejima et al. | |

FOREIGN PATENT DOCUMENTS

| | | |
|---|---|---|
| JP | 7-82186 | 8/1992 |
| JP | 6-43534 | 2/1994 |
| JP | 7-333687 | 12/1995 |
| JP | 10-304229 | 11/1998 |
| JP | 11-160775 | 6/1999 |
| JP | 3797712 | 4/2006 |

* cited by examiner

*Primary Examiner* — Yogesh K Aggarwal
(74) *Attorney, Agent, or Firm* — Oblon, Spivak, McClelland, Maier & Neustadt, L.L.P.

(57) ABSTRACT

A digital camera having a camera body, a shutter release button, a photographic optical system, a display cover, a lens/strobe flash cover, a nonskid grip pits/projection, a mode dial, operation buttons, indication lamps, a display screen, and a strobe flashing unit. When the camera is not in use, the display screen is covered by the display cover and a lens of the photographic optical system and the strobe flashing unit are covered by the lens/strobe flash cover to provide protection to such features. The lens/strobe flash cover is mechanically coupled to the display cover via a coupling mechanism such as a gear mechanism or a link mechanism or a chain/wire mechanism, or a combination of those mechanisms. An electric power switch to turn on and off an electric power supply to operate the digital camera is activated coupled to the movement of the display cover and the lens/strobe flash cover.

20 Claims, 7 Drawing Sheets

FIG. 6
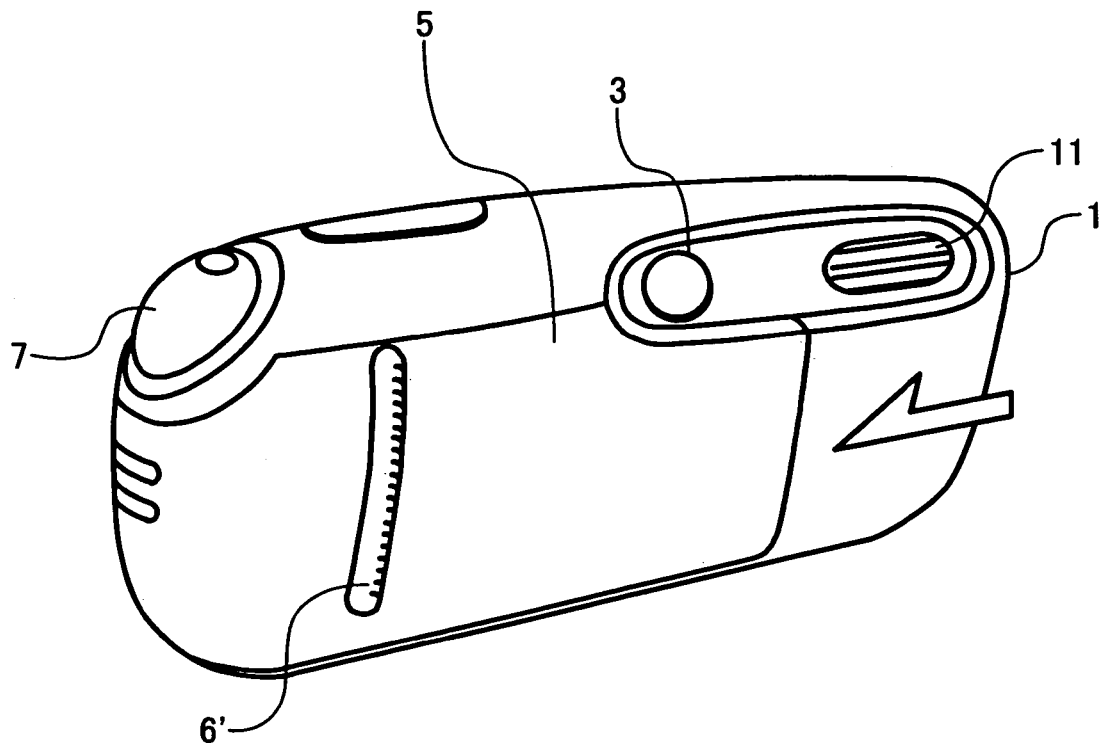
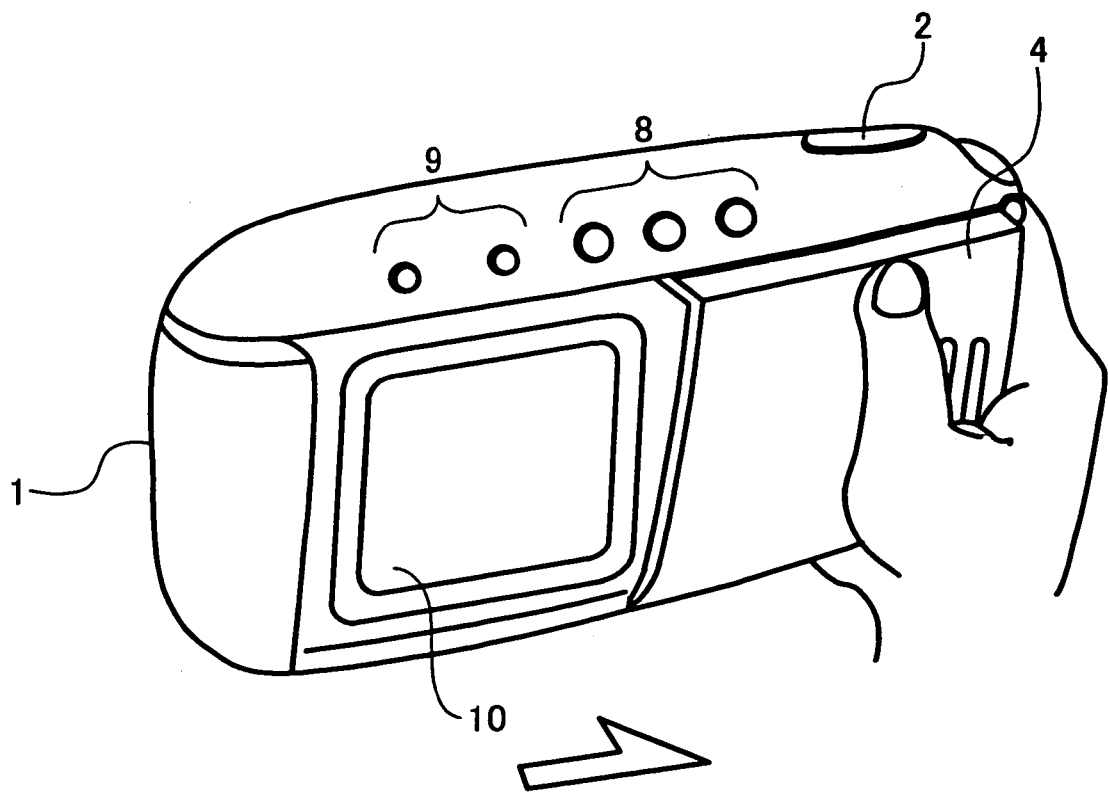

DIGITAL CAMERA WITH IMPROVED PORTABILITY AND EASE OF USE

CROSS REFERENCE TO RELATED APPLICATIONS

This application is a divisional of U.S. patent application Ser. No. 09/536,022, filed on Mar. 27, 2000, now U.S. Pat. No. 7,057,660, which claims priority to Japanese Patent Application No. 11-082803 filed on Mar. 26, 1999. The contents of each of these documents are incorporated herein by reference.

BACKGROUND OF THE INVENTION

1. Field of the Invention

The present invention relates to a digital camera that stores image information obtained by an imaging device in a recording medium, and more particularly, to a digital camera having an improved portability and ease of use and a method of protecting a digital camera.

2. Discussion of the Background

A camera using a photographic film (i.e. a silver halide film camera) has been generally used for photography. Recently, digital cameras have become increasingly widespread. In the digital cameras, an object image is photographed by a solid-state imaging device, such as a charged coupled device (CCD) or the like, and image data of an object are obtained and digitally recorded as static image (still image) or moving image (movie image) in an IC (integrated circuit) card, such as a printed circuit (PC) card with a semiconductor memory, a video floppy disk or the like.

In the digital cameras, except optical systems, almost all functions, from basic photographing functions to add-on accessory functions, are digitally performed. As image data of an object are processed electrically and a space for e.g. film transport mechanism is not required, much latitude is allowed in designing a structure of the camera compared to silver halide film cameras. Therefore, it is generally easy to design a digital camera surpassing in ease of use, portability and appearance through an appropriate plan for adequate functions and layout of each part.

However, at present, most of digital cameras are configured following a standard layout of silver halide film cameras, and therefore, layout and handling ease of a digital camera remains similar to that of a silver halide film camera. Further, not many digital cameras have a lens cover to protect its photographing lens.

For example, in Japanese Patent Laid-Open Publication No. 6-43534 and Japanese Published Patent Publication No. 7-82186, an example of a silver halide film camera, having a strobe flashing unit on a lens cover which moves up and down to cover and uncover the front of a photographing lens, is described, and the cameras are configured such that the front of the photographing lens is opened and at the same time the strobe flashing unit located inside of the lens cover is directed toward an object when the lens cover is moved upward to be opened. And the front of the photographing lens is covered by the lens cover and at the same time the strobe flashing unit located inside of the lens cover is concealed inside when the lens cover is moved downward to be closed. Further, the camera has a built-in collapsible rangefinder in the lens cover having a light passage above the photographing lens when the lens cover is opened.

Also, for example, a silver halide film camera, having a lens cover to cover and uncover the front of a photographing lens by sliding the lens cover in the directions of left and right, is described in Japanese Patent Laid-Open Publication No. 7-333687. The camera has a lens cover configured to open and expose the photographing lens when it is slid to the left (viewed from the front), and to close and cover the front of the photographing lens when it is slid to the right. In Japanese Patent Laid-Open Publication No. 7-333687, only the sliding lens cover is described and description of a strobe flashing unit is not included.

The cameras shown in the above-mentioned Japanese Patent Laid-Open Publication No. 6-43534 and Japanese Published Patent Publication No. 7-82186 are silver halide film cameras, not a digital camera, and the lens cover moves up and down. The lens cover of the camera in the above Japanese Patent Laid-Open Publication No. 7-333687 slide in the directions of left and right in front of the photographing lens. Further, the overall shape of cameras illustrated in Japanese Patent Laid-Open Publications Nos. 6-43534, 7-333687 and Japanese Published Patent Publication No. 7-82186 is that of a classic type.

As mentioned above, in digital cameras, even though much latitude is allowed, compared to silver halide film cameras, in designing a structure of the camera, the greater latitude is not fully utilized to improve ease of use, portability and appearance of the camera, and the digital cameras generally employ a classical shape of silver halide film cameras, and even though a lens cover to protect a photographing lens is incorporated, the shape of the digital cameras does not differ significantly from that of silver halide film cameras. Further in a digital camera, a display device such as a liquid crystal display (LCD) or the like is widely used for displaying an image information and various information relating to an operation of the camera. A cover glass may be used to protect a screen of the LCD, which however may cause a reduction of transmissivity to the screen and a reflection of light due to its permeability of light and reflected light of the surface, and the visibility of displayed image may be impeded.

SUMMARY OF THE INVENTION

The present invention advantageously provides a digital camera having an improved portability and ease of use and a method of protecting a digital camera using various covers.

The present invention includes a preferred embodiment of the digital camera that advantageously includes a camera body, a shutter release button, a photographic optical system, a display cover, a lens/strobe flash cover, a nonskid grip pits/projection, a mode dial, operation buttons, indication lamps, a display screen, and a strobe flashing unit. The camera has a shutter release button on the top of the camera body, the photographic optical system and the strobe flashing unit on the front of the camera body near an upper end on the left side (viewed from a photographer), the nonskid grip pits on the front of the camera body near a grip area on the right side (viewed from the photographer), the mode dial at an upper-right corner of the camera body, the operation buttons and the indication lamps near an upper end of the back of the camera body and the display screen on the back of the camera body occupying the left half (viewed from the photographer) of the back of the camera body.

When the camera is not in use, the display screen is covered by the display cover and a lens of the photographic optical system and the strobe flashing unit are covered by the lens/strobe flash cover.

The display cover is configured to slide in the directions of left and right within a predetermined sliding range. The display screen is covered when the display cover slides to the left end (viewed from the photographer) of the predetermined sliding range, and is opened completely when the display cover slides to the right end of the predetermined sliding range. The display cover is configured to be latched in each of stop positions so as not to open accidentally when it is closed and not to close accidentally when it is opened though the latch can be disengaged. The lens of the photographic optical system and the strobe flashing unit are covered when the lens/strobe flash cover slides to the right end (viewed from a photographer) of the predetermined sliding range, and are uncovered completely when the lens/strobe flash cover slides to the left end. The lens/strobe flash cover is mechanically coupled to the display cover via a coupling mechanism such as a gear mechanism or a link mechanism or a chain/wire mechanism, or a combination of those mechanisms.

An electric power switch to turn on and off an electric power supply to operate the digital camera is activated coupled to the movement of the display cover and the lens/strobe flash cover. Specifically the electric power switch is turned on and off when the display cover and the lens/strobe flash cover are opened and closed respectively.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 is a perspective view illustrating the front and the back of the digital camera with respective covers are opened according to another embodiment of the present invention.

DETAILED DESCRIPTION OF THE PREFERRED EMBODIMENTS

Figure 1:
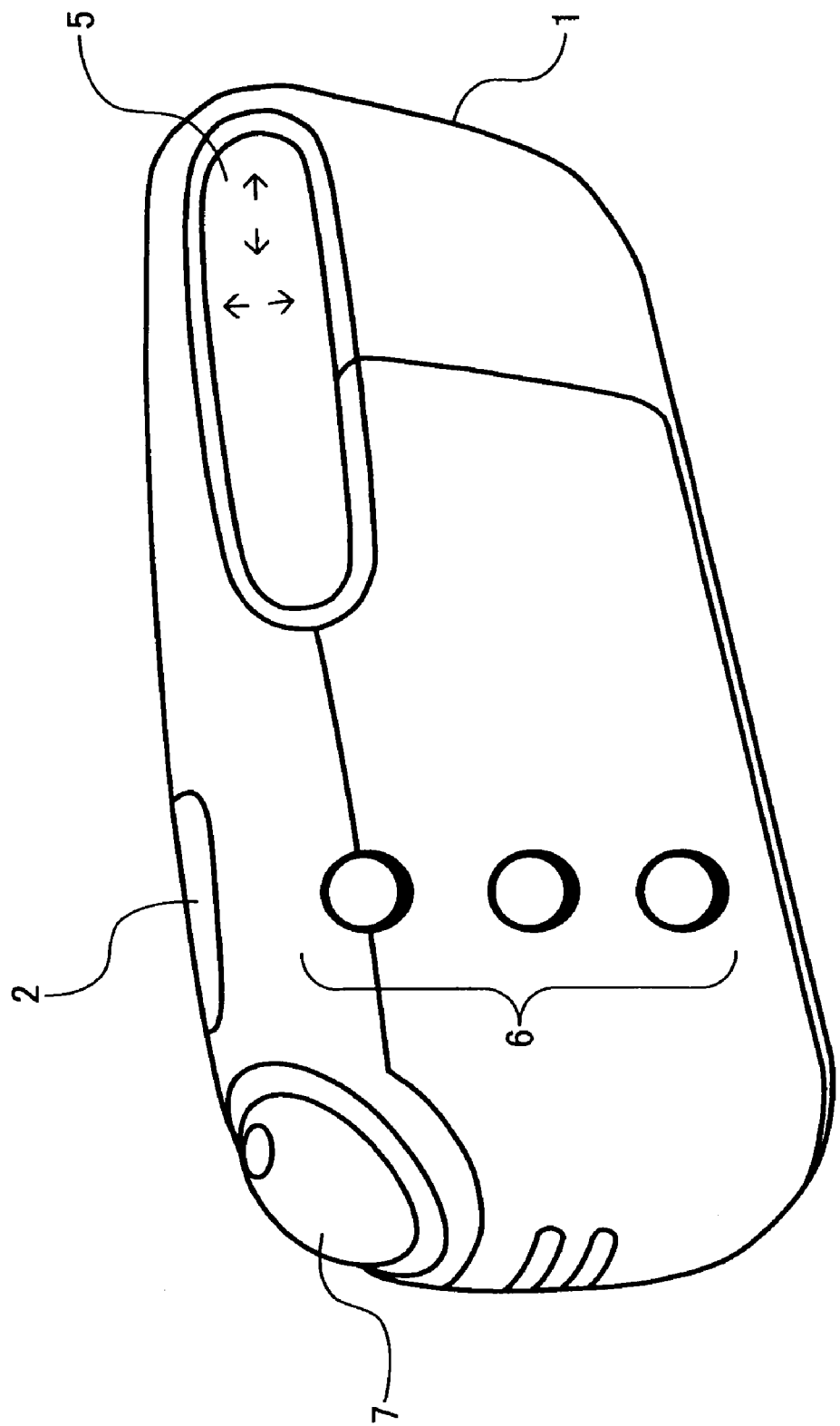
FIG. 1 is a perspective view illustrating a front of a digital camera not in use, e.g. being carried, according to an embodiment of the present invention.

Referring now to the drawings, wherein like reference numerals designate identical or corresponding parts throughout the several views, a digital camera illustrated in FIGS. 1-4 includes a camera body 1, a shutter release button 2, a photographic optical system 3, a display cover 4, a lens/strobe flash cover 5, a nonskid grip pits/projection 6, a mode dial 7, operation buttons 8, indication lamps 9, a display screen 10, and a strobe flashing unit 11.

The camera body 1 is shaped into almost a rectangular parallelepiped with curved corners. The camera has, as shown in FIGS. 1-4, the shutter release button 2 on the top of the camera body 1, the photographic optical system 3 and the strobe flashing unit 11 on the front of the camera body 1 near an upper end on the left side (viewed from a photographer), the nonskid grip pits 6 on the front of the camera body 1 near a grip area on the right side (viewed from the photographer), the mode dial 7 at an upper-right corner of the camera body 1, the operation buttons 8 and the indication lamps 9 near an upper end of the back of the camera body 1 and the display screen 10 on the back of the camera body 1 occupying the left half (viewed from the photographer) of the back of the camera body 1.

Figure 2:
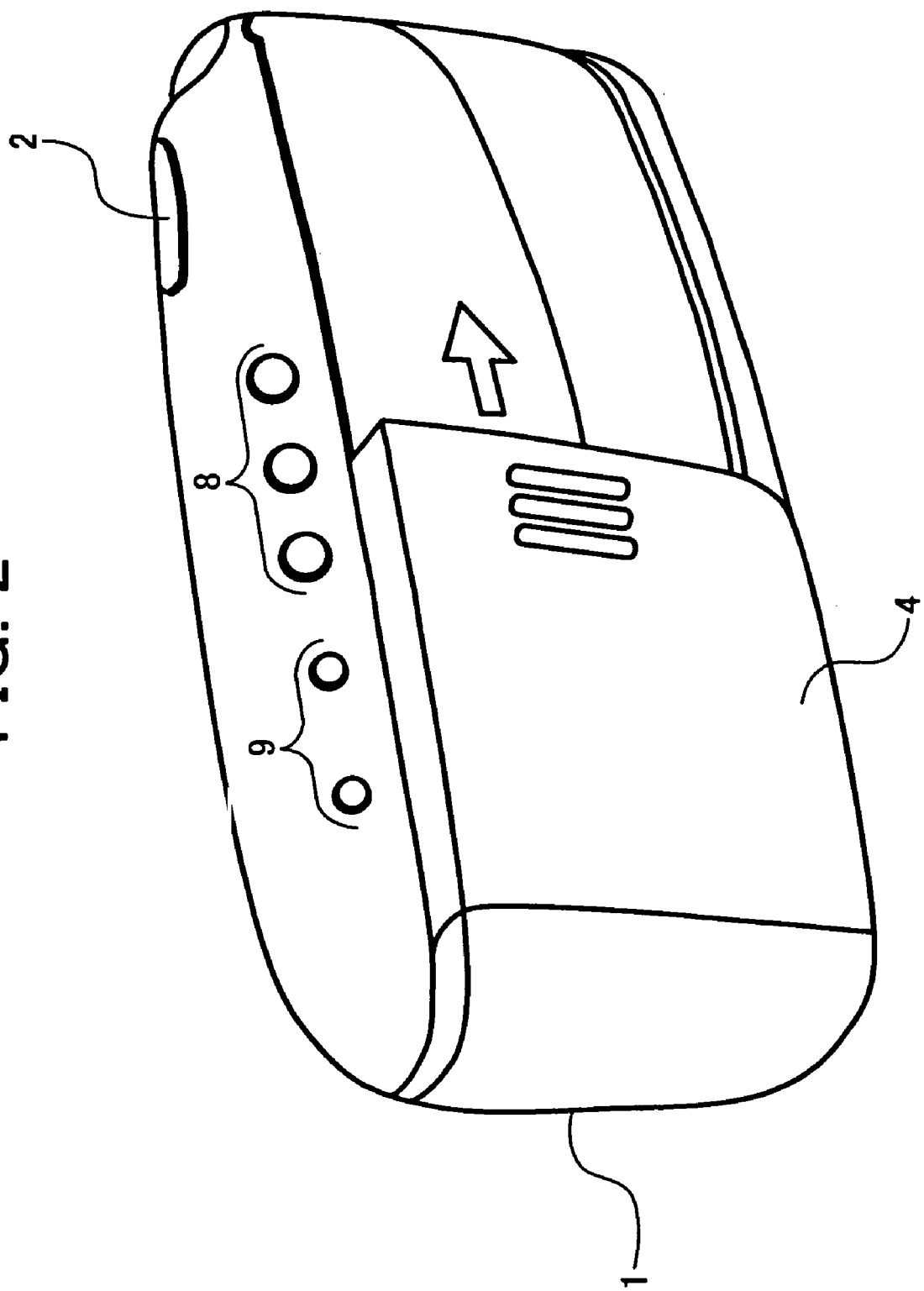
FIG. 2 is a perspective view illustrating a back of the digital camera not in use, e.g. being carried.

When the camera is not in use, the display screen 10 is covered by the display cover 4 (first cover), and a lens of the photographic optical system 3 and the strobe flashing unit 11 are covered by the lens/strobe flash cover 5 (second cover) as shown in FIGS. 1 and 2.

Figure 4:
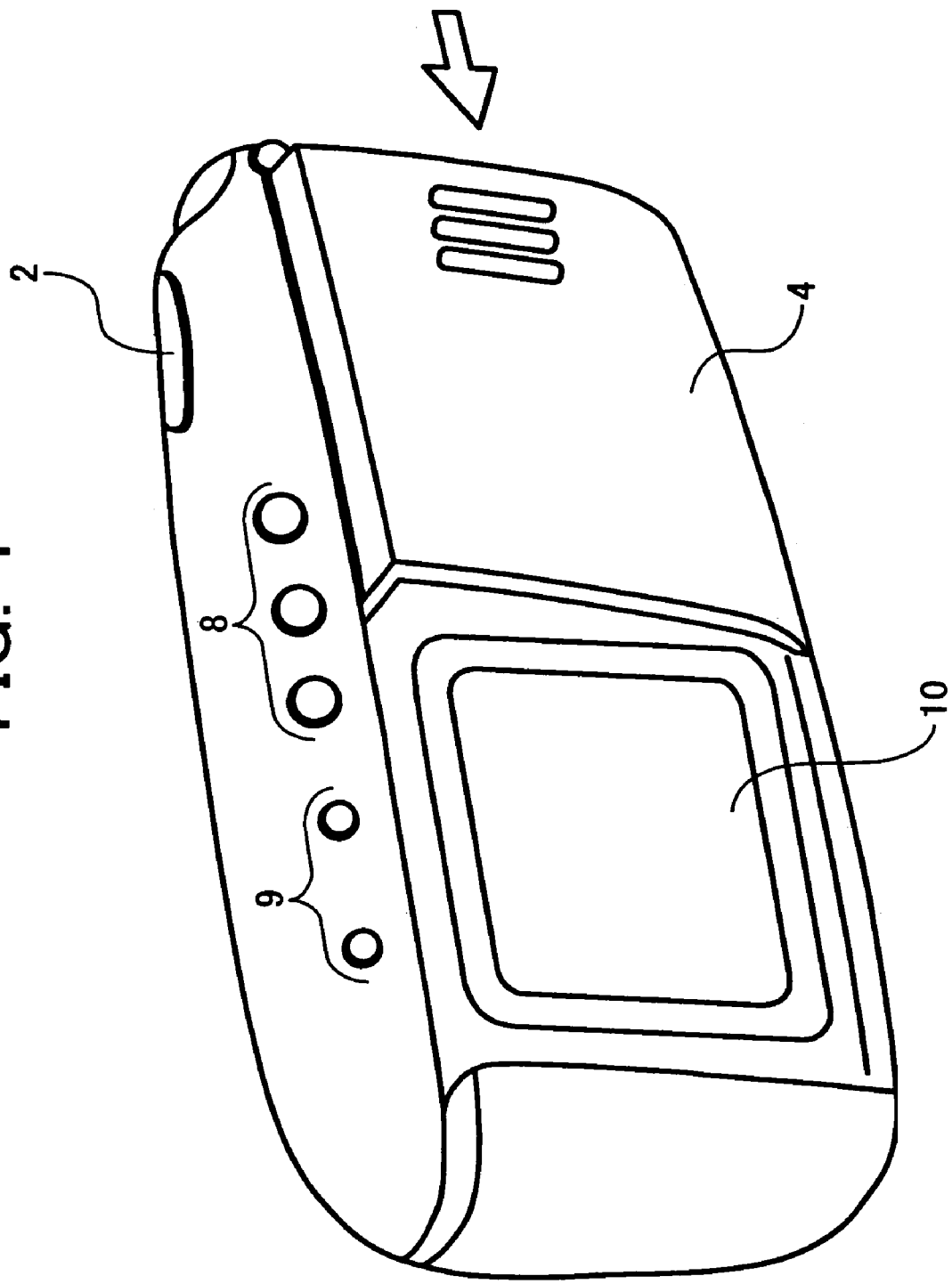
FIG. 4 is a perspective view illustrating the back of the digital camera in use.

The display cover 4 is configured to slide in the directions of left and right within a predetermined sliding range. The display screen 10 is covered when the display cover 4 slides to the left end (viewed from the photographer) of the predetermined sliding range, and is opened completely when the display cover 4 slides to the right end of the predetermined sliding range as illustrated in FIG. 4.

The display cover 4 is configured to be latched in each of stop positions so as not to open accidentally when it is closed and not to close accidentally when it is opened though the latch can be disengaged. It can be configured either such that the display cover 4 slides to close against a force of a spring and is locked by a locking mechanism when the cover is completely closed and when the lock is released the cover is opened by a spring force of the spring, or such that the cover slides to open against a force of a spring and is locked by a locking mechanism when the cover is fully opened and when the lock is released the cover is closed by a spring force of the spring.

The lens/strobe flash cover 5 is configured to slide in the directions of left and right within a predetermined sliding range. The lens of the photographic optical system 3 and the strobe flashing unit 11 are covered when the lens/strobe flash cover 5 slides to the right end (viewed from a photographer) of the predetermined sliding range, and are uncovered completely when the lens/strobe flash cover 5 slides to the left end. The lens/strobe flash cover 5 is mechanically coupled to the display cover 4 via a coupling mechanism such as a gear mechanism or a link mechanism or a chain/wire mechanism, or a combination of those mechanisms. Thus, the lens/strobe flash cover 5 is configured to open when the display cover 4 is opened and be closed when the display cover 4 is closed. When the display cover 4 is configured to move semi-automatically by a spring as described above, the lens/strobe flash cover 5 is configured so as to move by a power of the movement of the display cover 4. Further, it can be configured such that the lens/strobe flash cover 5 is slid in the directions of up and down instead of left and right directions.

An electric power switch to turn on and off an electric power supply to operate the digital camera is activated coupled to the movement of the display cover 4 and the lens/strobe flash cover 5. Specifically the electric power switch is turned on and off when the display cover 4 and the lens/strobe flash cover 5 are opened and closed respectively.

The nonskid grip pits/projection 6(6') includes a pit or a projection and is provided at positions where the forefinger, the middle finger and the third finger of the right hand touch respectively when a photographer hold the digital camera with the right hand. The nonskid grip pits/projection 6(6') enables the photographer to hold the camera firmly so that the camera may not slip off.

The mode dial 7 is used to make a selection of an operation mode of the digital camera. For example, a recording mode, a replay mode, a transfer mode or a setup mode is selected by rotating the mode dial 7. The operation buttons 8 are used to operate the functions other than those operated by the electric power switch 130, the shutter release button 2 and the mode dial 7, i.e. various settings of the camera including erasing of recorded images etc., selection of frames for erasing and making a final determination of the selected setting.

The indication lamps 9 indicates information, by lighting or blinking, including various warnings, flash readiness and others, which are not displayed on the display screen 10.

The display screen 10 displays image information obtained through an electronic viewfinder and various information relating to an operation of the digital camera, and the operation buttons 8 and the indication lamps 9 are located adjacent to and above the display screen 10. The strobe flashing unit 11 gives an auxiliary light to an object when required.

Figure 5:
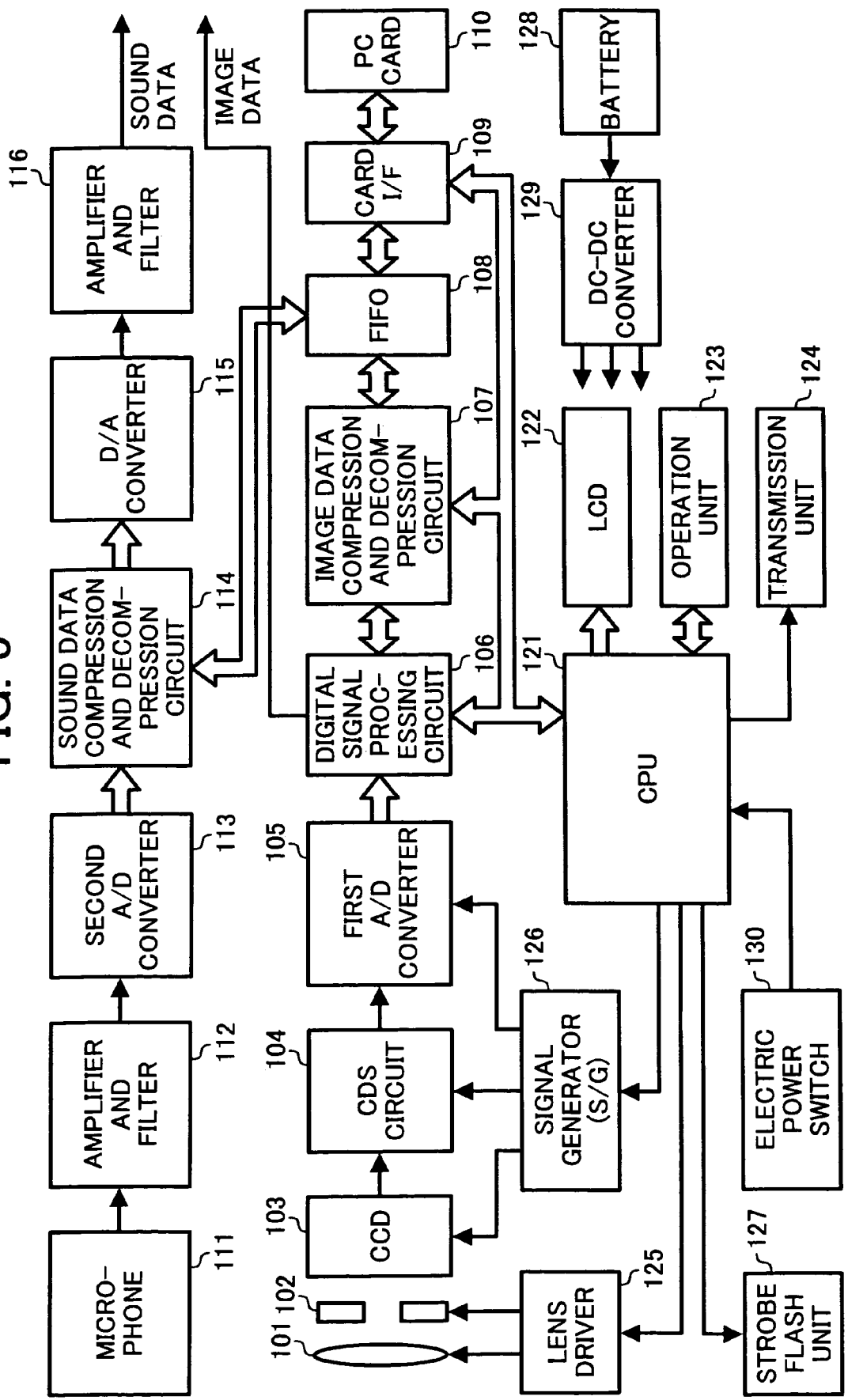
FIG. 5 is a block diagram showing an electrical structure of the camera.

FIG. 5 is an exemplary block diagram of a digital camera, according to an embodiment of the present invention. The camera photographs and records not only still images, i.e., static images but also moving images and sound data for a short time.

The digital camera illustrated in FIG. 5 includes a lens system 101, a shutter mechanism 102, a charge coupled device (CCD) 103, a correlate dual sampling (CDS) circuit 104, a first analog to digital (A/D) converter 105, a digital signal processing circuit 106, an image data compression and decompression circuit 107, a first-in first-out (FIFO) 108, a card interface (I/F) 109, a PC card 110, a microphone 111, an amplifier and filter 112 (AMP/FILTER), a second analog to digital (A/D) converter 113, a sound data compression and decompression circuit 114, a digital to analog (D/A) converter 115, an amplifier and filter 116, a central processing unit (CPU) 121, a display device (liquid crystal display—LCD) 122, an operation unit 123, a transmission unit 124, a lens driver 125, a signal generator (SG) 126, a strobe flash unit 127, a battery 128, a DC-DC converter 129 and an electric power switch 130.

A photographic optical system 3 includes the lens system 101 and the shutter mechanism 102 and forms an image of an object. The shutter mechanism 102 includes an aperture mechanism and a filter mechanism and controls an exposure time when a shutter is released. The CCD 103 is used as an imaging device in this embodiment. The CCD 103 converts an optical image obtained through the photographic optical system 3 to an electrical image. A photographic process device includes the CDS circuit 104, the first A/D converter 105, the digital signal processing unit 106, the image data compression and decompression circuit 107, the FIFO 108 and the CPU 121.

The CDS circuit 104 reduces noise in the electrical signal from the CCD 103. The A/D converter 105 converts analog image signals from the CCD 103 through the CDS circuit 104, to digital image data. The A/D converter 105 converts the signal from the CCD 103 to digital signals through the CDS circuit 104 with an optimum sampling frequency.

The digital signal processing circuit 106 separates the digital image data from the first A/D converter 105 into color-difference data and luminance data, and performs various processes on the separated data including processes for correction and compression/decompression. The image data compression and decompression circuit 107 performs the process of an orthogonal transformation and a Huffman encoding/decoding for image data compression/decompression, e.g., in conformity with the Joint Photographic Experts Group (JPEG) standard.

Sound is converted into electrical signals by the microphone 111. In the AMP/FILTER 112, the sound signals in a predetermined band are passed through and are selectively amplified. The second A/D converter 113 then converts the sound signals passed through the AMP/FILTER 112 into digital sound data with a sampling frequency which is more than double the frequency of the predetermined band. Then, the sound data compression and decompression circuit 114 compresses and encodes the digital sound data.

The FIFO 108 is a temporary memory device such as a Dynamic Random Access Memory (DRAM) and a flash memory or the like and temporarily stores compressed image and sound data therein. The compressed image and sound data stored in the FIFO 108 are read out by the card interface (I/F) 109 and are recorded in the PC card 110, a recording medium, which is connected to the card interface (I/F) 109.

The CPU 121 controls operations of each unit of the digital camera according to instructions from the operation unit 123.

The display device 122 displays, by means of the display screen 10, the mode selected and indicates operational conditions of the digital camera. The display device 122 displays in real time digital image data of an object, before photographing and during photographing, which is output from the digital image processing circuit 106 via the CPU 21. The display device 122 also displays a static image of digital image data of a photograph taken during a predetermined time so that the operator can check the image.

The display device 122 further displays recorded image data in the PC card 110. The image data in the PC card 110 are read out through the card interface (I/F) 109 and the FIFO 108, and are decompressed in the image data compression and decompression circuit 107, and then are transferred from the digital signal processing circuit 106 to the CPU 121. Sound data are transferred from the FIFO 108 to the sound data compression and decompression circuit 114 in which the sound data are decompressed, and are converted into analog signals in the D/A converter 115 and then are output through the amplifier and filter 116. The operation unit 123 includes operation devices, such as the shutter release button 2 to input a photographing instruction, the mode dial 7, the operation buttons 8 and the indication lamps 9 to indicate operational conditions.

When instructed by the operation unit 123, the transmission unit 124, being controlled by the CPU 121, transmits image data output from the digital signal processing circuit 106 and sound data output from the amplifier and filter 116 to an external computer etc.

The lens driver 125 drives the lens system 101 and the shutter mechanism 102 that include the photographic optical system 3 according to a control signal provided by the CPU 121. The SG 126 generates drive control signals such as clock signals and provides the CCD 103, the CDS circuit 104 and the first A/D converter 105 with the generated signals to perform respective functions. The strobe flash unit 127, being controlled by the CPU 121, flashes to illuminate an object when the shutter mechanism 102 is released.

A power unit of the digital camera includes the battery 128 and the DC-DC converter 129. As the battery 128, a nickel cadmium (Ni—Cd) battery, a nickel hydrogen battery or a lithium battery is used. Voltage is converted to an appropriate level by the DC-DC converter 129 to be supplied to the whole system of the digital camera.

Figure 3:
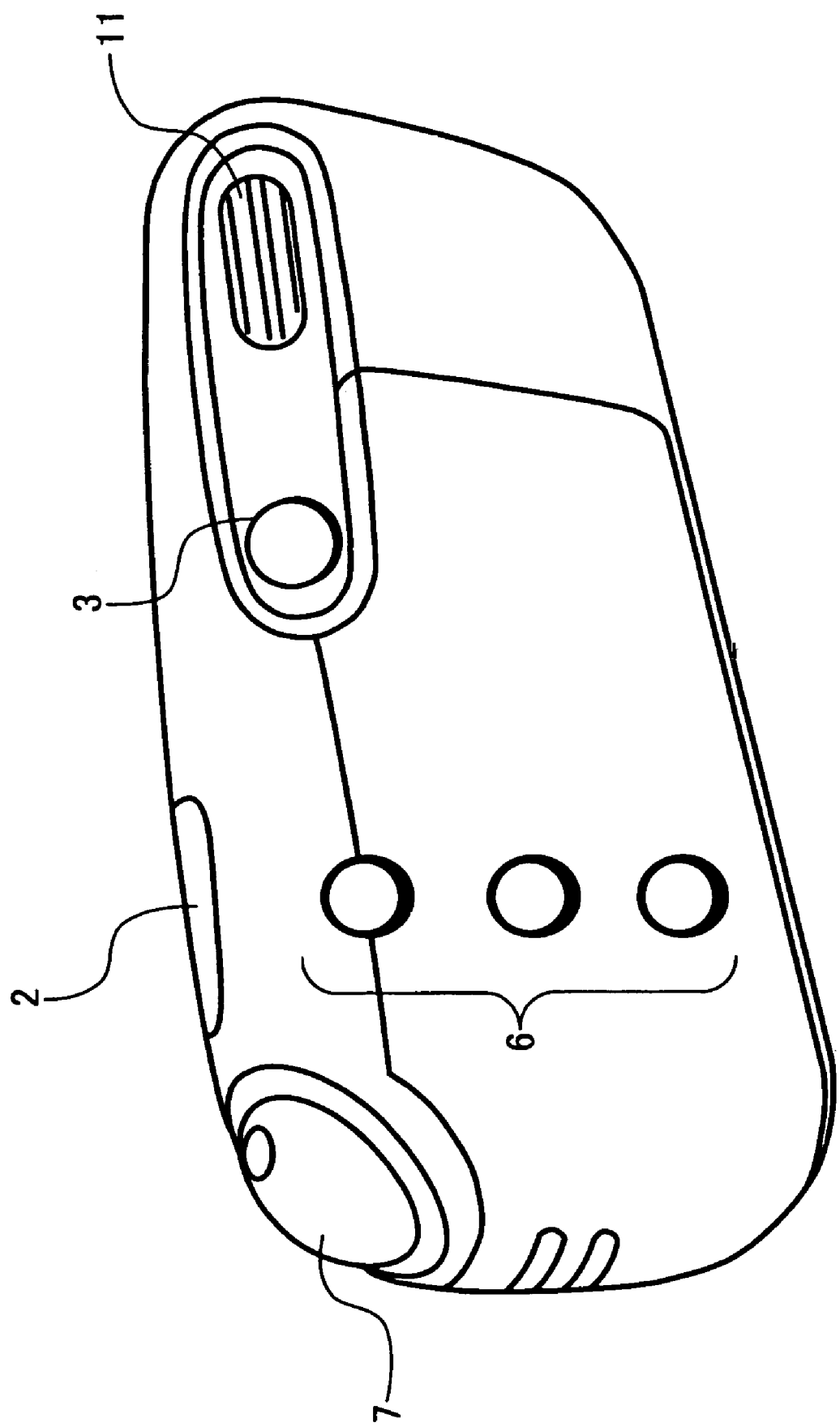
FIG. 3 is a perspective view illustrating the front of the digital camera in use.

The electric power switch 130 controls electric power supply through the DC-DC converter 129 giving control signals to the CPU 21. The electric power switch 130 is coupled to a movement of the display cover 4 and the lens/strobe flash cover 5, and is turned off when the display cover 4 and the lens/strobe flash cover 5 are closed as illustrated in FIGS. 1 and 2, and is turned on when the above mentioned two covers are opened as illustrated in FIGS. 3 and 4.

To take a picture with the digital camera, the display cover 4 is slid to open, and then the shutter release mechanism 102 of the photographic optical system 3 is opened to photograph an object image through the CCD 3 with an operation of the shutter release button 2 in the operation unit 123 while monitoring the object image obtained through the electronic viewfinder and displayed on the display screen 10 of the display device 122. The image data are recorded in the PC card 110 through the digital signal processing circuit 106.

As described above, when the camera is carried or is not being used, the display cover 4 and the lens/strobe flash cover 5 can be closed, and the display screen 10 of the display device 122, the lens of the photographic optical system 3 and the strobe flashing unit 11 ate covered by the display cover 4 and the lens/strobe flash cover 5. Thus, when the display cover 4 and the lens/strobe flash cover 5 are closed, the body of the digital camera is shaped into almost a rectangular parallelepiped with a curved surface at every corner having almost no projections outside of the camera body. Further a photographer can carry the camera without having a feeling of uneasiness because not only the lens of the photographic optical system 3, the display screen 10 and the strobe flashing unit 11 are not exposed but also the electric power supply is turned off by the electric power switch 130 when the display cover 4 and the lens/strobe flash cover 5 are closed. Accordingly, even when the shutter release button 2 in the operation unit 123 is pressed accidentally, the photographic processing system of the camera is not activated.

The digital camera can be in a standby condition, i.e. ready for use when the display cover 4 is slid to open that opens the lens/strobe flash cover 4 at the same time as illustrated in FIG. 6 (The nonskid grip 6' in FIG. 6 has a linear projection different from the one illustrated in FIGS. 1 and 3), then, the lens of the photographic optical system 3, the display screen 10 and the strobe flashing unit 11 are exposed and the electric power switch 130 is turned on in response to the movement of the display cover 4, and the CPU 121 is activated to control a photographic processing system.

During a standby condition, a photographer can select either a picture taking or a replay mode by the mode dial 7. When the picture taking mode is selected, and when the shutter release button 2 is pressed, the CPU 121 activates an auto focus function and opens the shutter mechanism 102 and then records image data of a focused object in the PC card through the digital signal processing circuit 106.

In the replay mode, image data of an object recorded in the PC card 110 are read out and a reproduced image is displayed on the display screen 10 of the display device 122.

The camera body 1 of the digital camera described above, including the display cover 4 and the lens/strobe flash cover 5, is configured to be almost a rectangular parallelepiped with a curved surface at every corner maintaining a fine appearance without being large in size and without losing a handling comfort. Further, when the camera is not in use, because the lens of the photographic optical system 3, the display screen 10 and the strobe flashing unit 11 are covered so as not to be exposed and further the electric power switch 130 is turned off, the camera can be carried safely and easily.

Further, in the mechanism of the covers described above, the lens/strobe flash cover 5 is moved by a movement of the display cover 4. However, it also can be configured such that the display cover 4 is moved by a movement of the lens/strobe flash cover 5.

Figure 7:
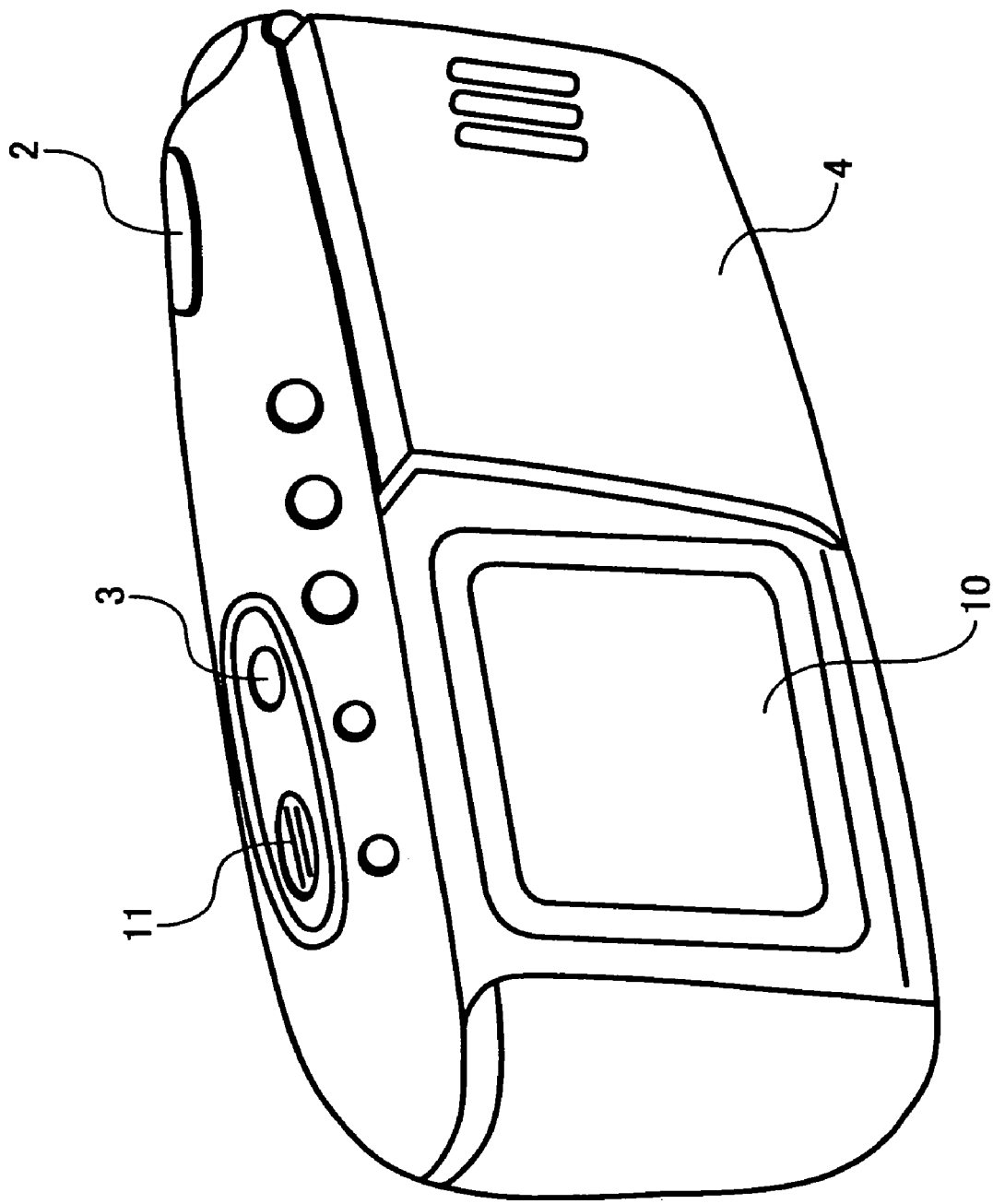
FIG. 7 is a perspective view illustrating a top of the digital camera in use according to another embodiment of the present invention.

Furthermore, the camera body 1 of the digital camera also can be configured such that the display screen 10 of the display device 122 is positioned on a top of the camera body 1 while the photographic optical system 3 and the strobe flashing unit 11 are positioned on the front of the camera body 1 as illustrated in FIG. 7 so that the camera is held vertically when the picture is taken.

Obviously, numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 11-082803, filed on Mar. 26, 1999, and the entire contents thereof are herein incorporated by reference.

What is claimed as new and is desired to be secured by Letters Patent of the United States is:

1. A digital camera, comprising:
   a camera body, said camera body being longer in a lateral direction than in a vertical direction perpendicular to the lateral direction;
   an optical system including a lens positioned on a first side of said camera body; a flash device secured to said camera body on the first side of said camera body and at a same constant distance from said lens at all times, said lens and said flash device being arranged in the lateral direction, and said flash device flashing and illuminating a photographic subject; and
   a cover device coupled to said camera body and configured to cover said lens and a front surface of said flash device, said cover device including a cover member configured to cover and uncover said lens and said flash device by sliding in the vertical direction, parallel to the surface of the first side of said camera body, within a range of said camera body at the first side of said camera body, wherein
   said lens is arranged at an upper edge of the first side of said camera body.

2. The digital camera according to claim 1, wherein said cover device is configured to actuate a power switch to said digital camera when said cover device is moved from a closed position to an open position.

3. The digital camera according to claim 1, further comprising a display device positioned on a second side of said camera body, wherein said second side of said camera body is opposite to said first side of said camera body.

4. The digital camera according to claim 1, wherein said lens and said flash device are horizontally arranged side by side.

5. The digital camera according to claim 1, further comprising:
   a switch device positioned on said camera body, said switch device configured to operate said cover member to cover and uncover said lens and said flash device.

6. The digital camera according to claim 5, wherein said switch device is provided on a second side of said camera body which is opposite to said first side of said camera body.

7. The digital camera according to claim 6, wherein said switch device includes a mechanical slide which operates between stop positions in said lateral direction to operate said cover member to cover and uncover said lens and said flash device.

8. The digital camera according to claim 7, further comprising:
   a display device provided on said second side of said camera body, wherein said mechanical slide includes a display cover coupled to said camera body, said display cover configured to slide between covered and uncovered stop positions to cover and uncover, respectively, said display device, wherein
   said cover member is coupled to said display cover so that said cover member is configured to (1) uncover said lens and said flash device when said display cover is slid to said uncovered stop position, and (2) cover said lens and said flash device when said display cover is slid to said covered stop position.

9. The digital camera according to claim 8, wherein said display cover includes latches at each of said stop positions to releasably lock said display cover into said uncovered and covered stop positions.

10. The digital camera according to claim 5, wherein said switch device includes an electrical switch to turn off and on, respectively, a power supply to operate said digital camera when said cover member is operated to cover and uncover said lens and said flash device.

11. The digital camera according to claim 1, further comprising:
a shutter mechanism configured to take in a reflection of light from said photographic subject, said flash device flashing and illuminating said photographic subject when said shutter mechanism is released.

12. A digital camera comprising:
a camera body, said camera body being longer in a lateral direction than in a vertical direction perpendicular to the lateral direction;
an optical system having a lens positioned on a first side of said camera body, said optical system including a means for covering said lens by sliding in the vertical direction, parallel to the surface of the first side of said camera body, within a range of said camera body at said first side of said camera body; and
a flash device secured to the camera body on the first side of said camera body and at a same constant distance in the lateral direction from said lens at all times, wherein
said means for covering said lens covers a front surface of said flash device,
said flash device flashes and illuminates a photographic subject, and
said lens is arranged at an upper edge of the first side of said camera body.

13. The digital camera according to claim 12, wherein said means for covering said lens includes a cover member that is slidably actuated between an open position and a closed position.

14. The digital camera according to claim 12, wherein said means for covering said lens is configured to actuate a power switch to said digital camera when said means for covering said lens uncovers said lens.

15. The digital camera according to claim 12, further comprising a display device positioned on a second side of said camera body, wherein said second side of said camera body is opposite to said first side of said camera body.

16. The digital camera according to claim 12, further comprising:
a shutter mechanism configured to take in a reflection of light from the photographic subject, said flash device flashing and illuminating the photographic subject when the shutter mechanism is released.

17. A method for protecting a digital camera, the digital camera including a camera body that is longer in a lateral direction than in a vertical direction perpendicular to the lateral direction, an optical system having a lens positioned on a front of said camera body, and a flash device positioned on the front of said camera body and positioned at a same constant distance in the lateral direction from said lens at all times, said method comprising:
covering said lens with a cover device including a cover member coupled to said camera body and configured to cover and uncover said lens by sliding in the vertical direction, parallel to the surface of the front of said camera body, within a range of said camera body at the front of the camera body;
covering a front surface of said flash device with said cover device when covering the lens; and
flashing and illuminating a photographic subject by said flash device, wherein
said digital camera further includes said lens arranged at an upper edge of the front of said camera body.

18. The method according to claim 17 further comprising the step of actuating a power switch to said digital camera when said cover device is moved from a closed position to an open position.

19. The method according to claim 17, wherein said digital camera further includes a display device positioned on a back of said camera body, wherein said back of said camera body is opposite to said front of said camera body.

20. The method according to claim 17, wherein
the digital camera includes a shutter mechanism configured to take in a reflection of light from the photographic subject, and
the flashing and illuminating of the photographic subject is performed in response to releasing the shutter mechanism.

* * * * *